Dec. 21, 1937.　　　　　W. H. FRANK　　　　　2,103,072
DISTRIBUTION PANEL
Filed Aug. 10, 1936　　　5 Sheets—Sheet 1
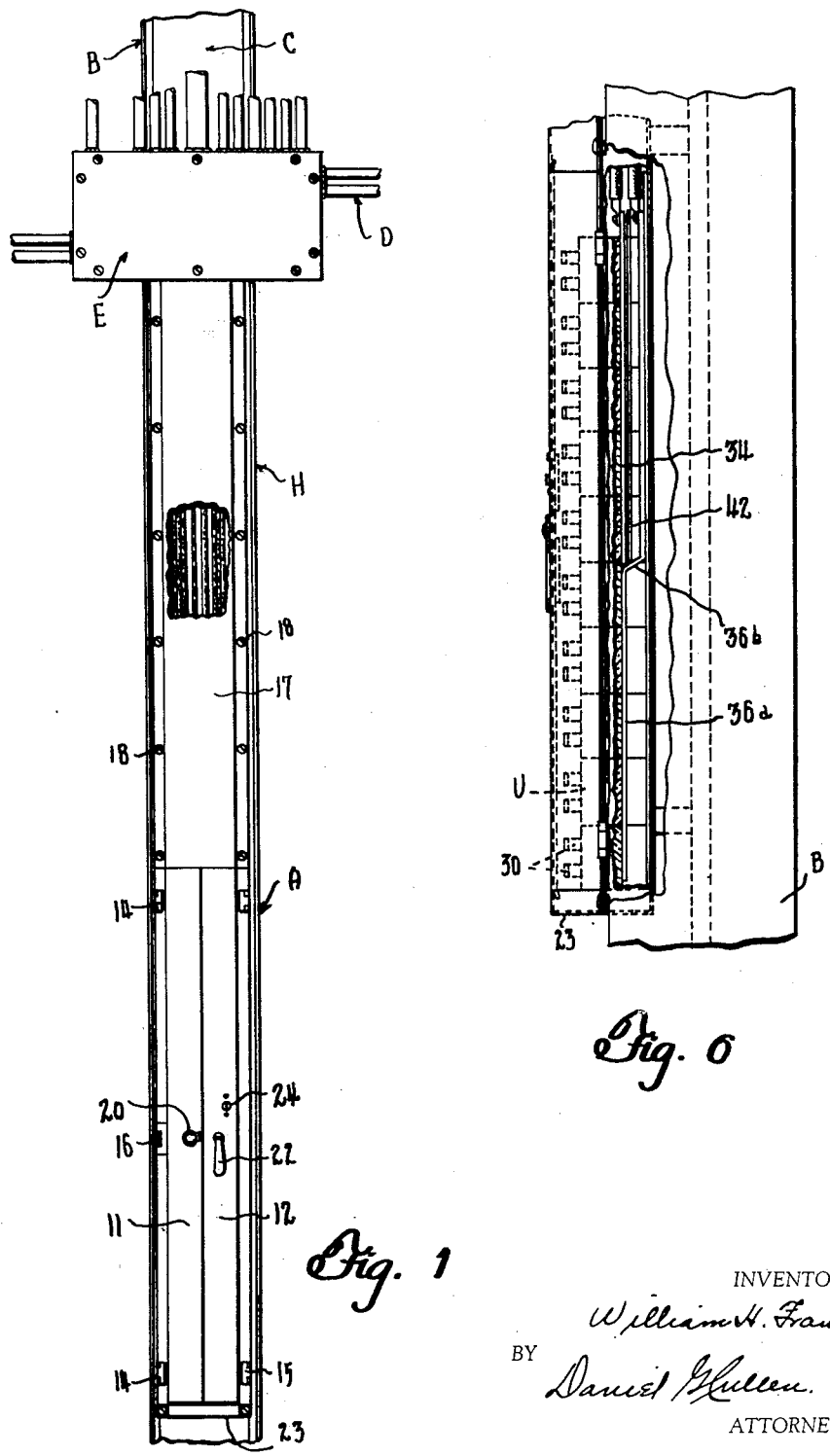
INVENTOR.
William H. Frank
BY Daniel G. Mullen.
ATTORNEY.

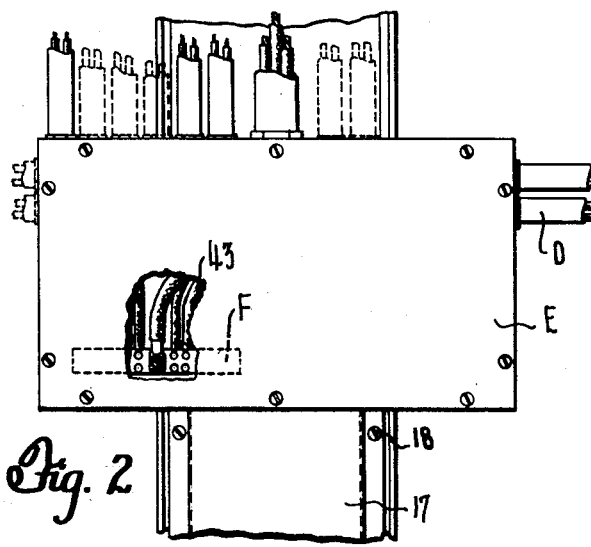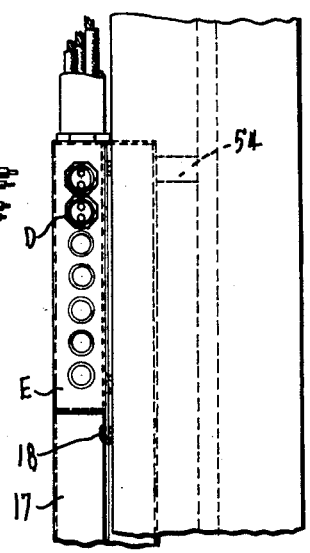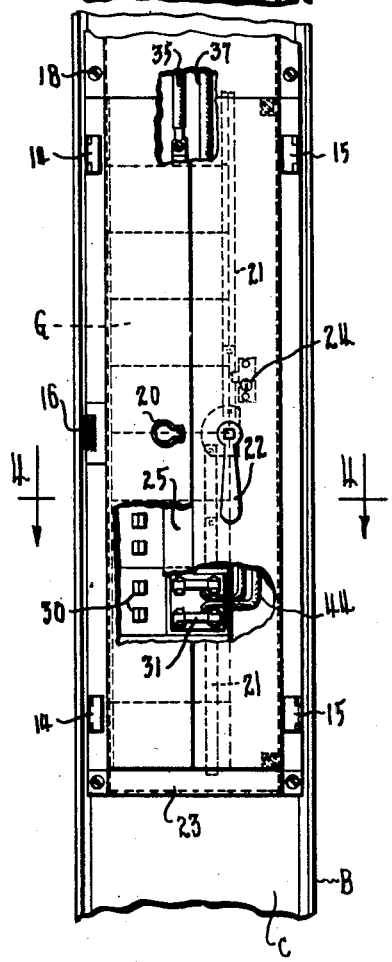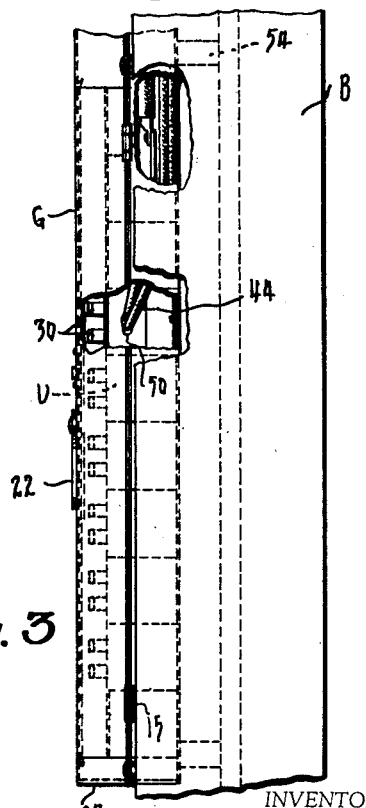

Dec. 21, 1937. W. H. FRANK 2,103,072
DISTRIBUTION PANEL
Filed Aug. 10, 1936 5 Sheets-Sheet 3

INVENTOR.
William H. Frank
BY Daniel G. Cullen
ATTORNEY.

Dec. 21, 1937.  W. H. FRANK  2,103,072
DISTRIBUTION PANEL
Filed Aug. 10, 1936   5 Sheets-Sheet 4

INVENTOR.
William H. Frank
BY Daniel G. Cullen
ATTORNEY.

Dec. 21, 1937.   W. H. FRANK   2,103,072
DISTRIBUTION PANEL
Filed Aug. 10, 1936   5 Sheets—Sheet 5

INVENTOR.
William A. Frank
BY Daniel G. Cullen
ATTORNEY.

Patented Dec. 21, 1937

2,103,072

UNITED STATES PATENT OFFICE 2,103,072

DISTRIBUTION PANEL

William H. Frank, Detroit, Mich.

Application August 10, 1936, Serial No. 95,162

3 Claims. (Cl. 247—10)

This application relates to electrical distribution panelboard installations.

In the art of electrical distribution it is common practice to mount distribution panelboards on building columns and to run conduit vertically from an overhead horizontal conduit run to the panelboards for the main and branch cables. Where the panelboard is a fraction of the column in length, as it usually is, there will be on the column, lengths of conduit between the overhead horizontal run and the upper end of the panelboard.

In order to eliminate the necessity for providing such conduit runs on the column and at the same time to provide protection for the main and branch cables between the upper end of the panelboard and the overhead run of conduit, it is proposed by this application to provide the casing of the panelboard with extensions running along the column from the panel within the panelboard to the overhead run of conduit, and these extensions may be formed as parts of the casing enclosing the panel and with it forming a panelboard.

The panel casing forming part of the panelboard may be and is shown in the nature of a split sheet metal duct of uniform cross section and its upper end joins directly with the overhead run. Within the vertical duct or casing forming part of the panelboard and near the lower end thereof is the panel per se, and the panel casing section between the upper end of the panel per se and the overhead duct provides a panel pull box for the main and branch cables. Thus the necessity for providing separate conduit run on the column between the upper end of the panel and the overhead run near the ceiling is eliminated. In addition the panelboard installation in appearance is much more attractive for the reason that the casing is uniform in appearance, all along the column upon which it is mounted; and is much more economical of manufacture, installation, and maintenance, since separate conduits are eliminated.

The panel casing shown is made up of duct of rectangular cross section and centrally split and it may be used with overload runs wherein the conduit is of the same character.

While it may be preferred to use the panelboard installation here shown in a system wherein all of the conduit is duct of the same character that is used in the fabrication of the panel casing, for purposes of convenience the installation here shown is illustrated in connection with an overhead run whose conduit is of the conventional tubular pipe form.

The panelboard itself is narrow and of novel type and construction, lending itself particularly to use on narrow columns, and its cross section is small enough to permit the panelboard to be mounted on a standard building column without projecting laterally beyond the column except in one direction only, namely towards the face of the panel. For this reason, as well as for the reasons above mentioned, and other reasons, such as safety, freedom from injury, etc., a panelboard installation wherein the panelboard is of the type here shown is much more attractive, appealing, and satisfactory than panelboard installations of the type heretofore known, where the panelboard was wider than the column and projected laterally therefrom not only in a direction towards the face of the panel but also in the transverse direction.

Other features of advantage of the panelboard installation here shown, and advantageous details of construction of the panelboard here shown, will be understood upon reference to the appended drawings illustrating an installation of the type here being considered. In these drawings, Fig. 1 shows an installation of a panelboard upon a vertical column in conjunction with an overhead run;

Fig. 2 is an enlarged fragmentary view;

Fig. 3 is a view as if from the right of Fig. 2;

Fig. 6 is a fragmentary view showing details of another type of installation;

Figure 7:
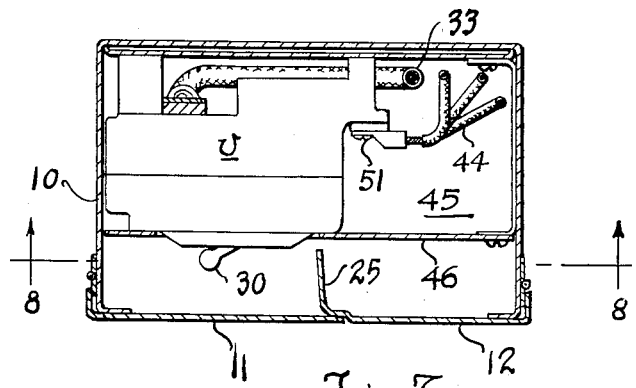
Figure 8:
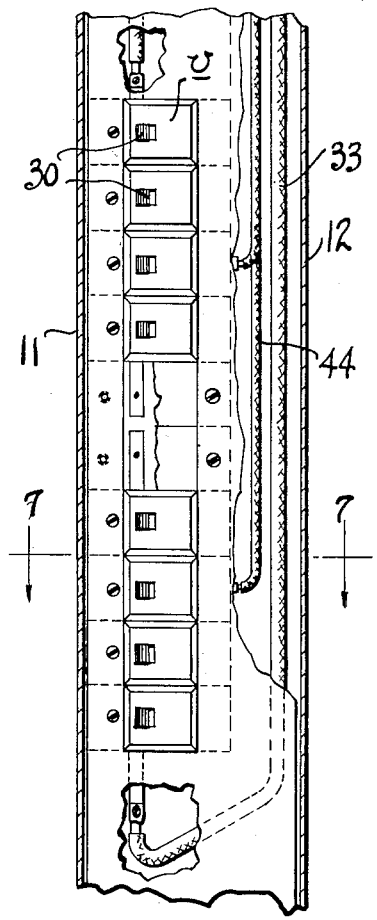
Figure 9:
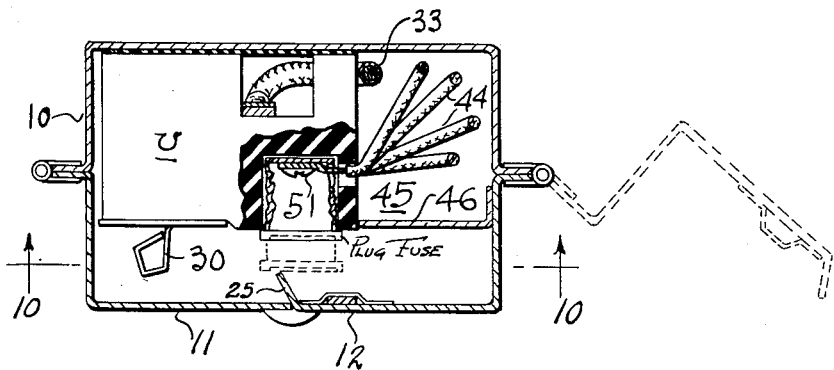
Figure 10:
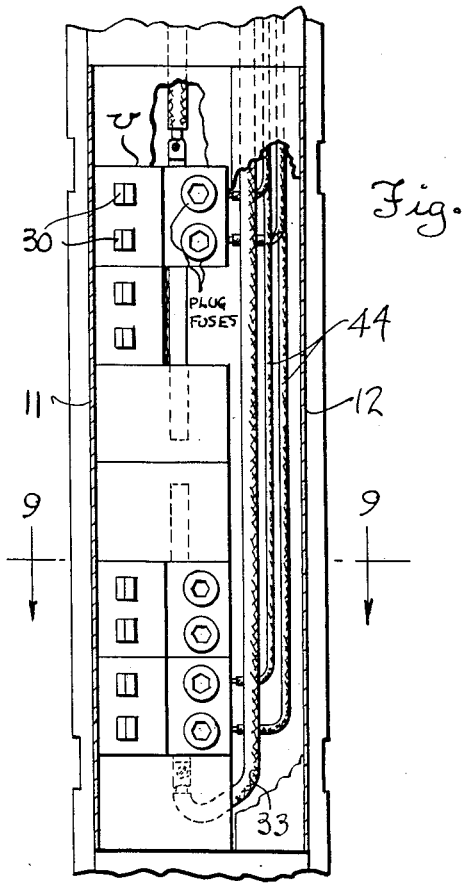

Figs. 7 and 9 show in cross section two other installations on lines 7—7, 9—9 of Figs. 8 and 10;

Figs. 8 and 10 are elevation views of those installations.

For an understanding of these drawings, reference should be had to the following detailed descriptive matter wherein like reference numerals refer to like parts on the drawings.

Referring to Fig. 1 it will be seen that the panelboard A there shown is associated with a narrow type vertical column B which may be of any standard cross section and which for purposes of convenience is shown as in the form of an H beam (Fig. 4), the same providing a channel C in which is disposed the panelboard, the same being associated with an overhead cable run D disposed near the ceiling of the building and containing the main feed and branch circuit cables which are to be connected to the distribution panelboard. A pull box E is shown as the juncture between the panelboard A and the overhead cable run D and is shown as including a neutral bar F whereby a satisfactory 3/2 wire installation may be effected, in a manner that will be described later in this specification.

The panelboard includes a casing of sheet metal formed of a base part 10 running from the lower end of the panelboard to the pull box E, and its lower portion, containing the panel G, is covered by a double cover having a part 11 and a part 12, both parts being hingedly though separably connected to the base part 10 at the mating flanges 14—15, the hinge for part 11 including a spring 16 which normally tends to keep the cover part 11 closed.

For purposes that will later be made apparent, the cover part 11 will hereafter be referred to as the public cover of the panelboard and the cover part 12 will hereafter be referred to as the maintenance cover of the panelboard.

As stated, the base part 10 extends from the lower end of the panelboard to the pull box E of the cable run D and the covers 11—12 extend from the lower end of the panelboard to a distance upwardly therefrom sufficient only to cover the panel G installed within the casing and forming part of the panelboard. In the embodiment disclosed the covers terminate at a considerable distance from the overhead run and that section of the base 10 between the upper ends of the covers 11—12 and the overhead run is closed by a cover plate 17 which is formed of the cross section of the covers 11—12 combined and which cooperates with that section of the base 10 covered by it to form a panel feed pull box H between the upper end of the panel G and the overhead run D. Bolts 18 secure the covers 17 to the base 10.

The upper end of the panel feed pull box H is of course connected to pull box E so that cables within the overhead run and leading to the panelboard at the lower end of the base 10 will be enshrouded within the panel feed pull box and thus completely protected from their point of emergence from the overhead run to the point where they are associated and combined with the panel proper.

The public cover 11 is provided with a latching handle 20 whereby it may be swung open if desired against the influence of the spring 16 and the maintenance cover 12 is provided with a latch including pull rods 21 and a handle 22 whereby it may be opened if desired, or left closed, with the pull rods engaging the plate 17 and a flange of an end closure plate 23 which closes the lower end of the panel casing formed by the portion 10 and the covers 11—12. In addition, the maintenance cover 12 is provided with a lock 24 whereby unauthorized opening of the maintenance cover 12 may be prevented.

It will be observed that the public cover 11 when closed overlaps a portion of the bevel masking plate 25 which is secured to the maintenance cover 12 and which is formed to provide guides 26 for the pull rods 21 of the maintenance cover latch, and to extend to the panel proper G for masking. The latch 20 of the public cover cooperates with a notch formed in the bevel part of the masking plate 25. These details of construction interlock the two covers so that while the public cover may at all times be opened, it cannot be latch closed unless the maintenance cover has been closed previously.

Disposed within that portion of the base 10 covered by the covers 11 and 12 is the sectional panel G formed of circuit protective units U, these being of any desired type though shown as of the single pole switch-fuse type wherein branch circuit control switches having handles 30 and branch circuit protective fuses 31 are included. Each unit comprises a body of insulation mounting the switch parts and the fuses, and each unit is formed at its back with notches 32—33. The units may be mounted as shown and as is conventional in sectional panelboard construction so that their notches 32—33 will align to form channels for purposes that will be described.

Figures 4, 5:
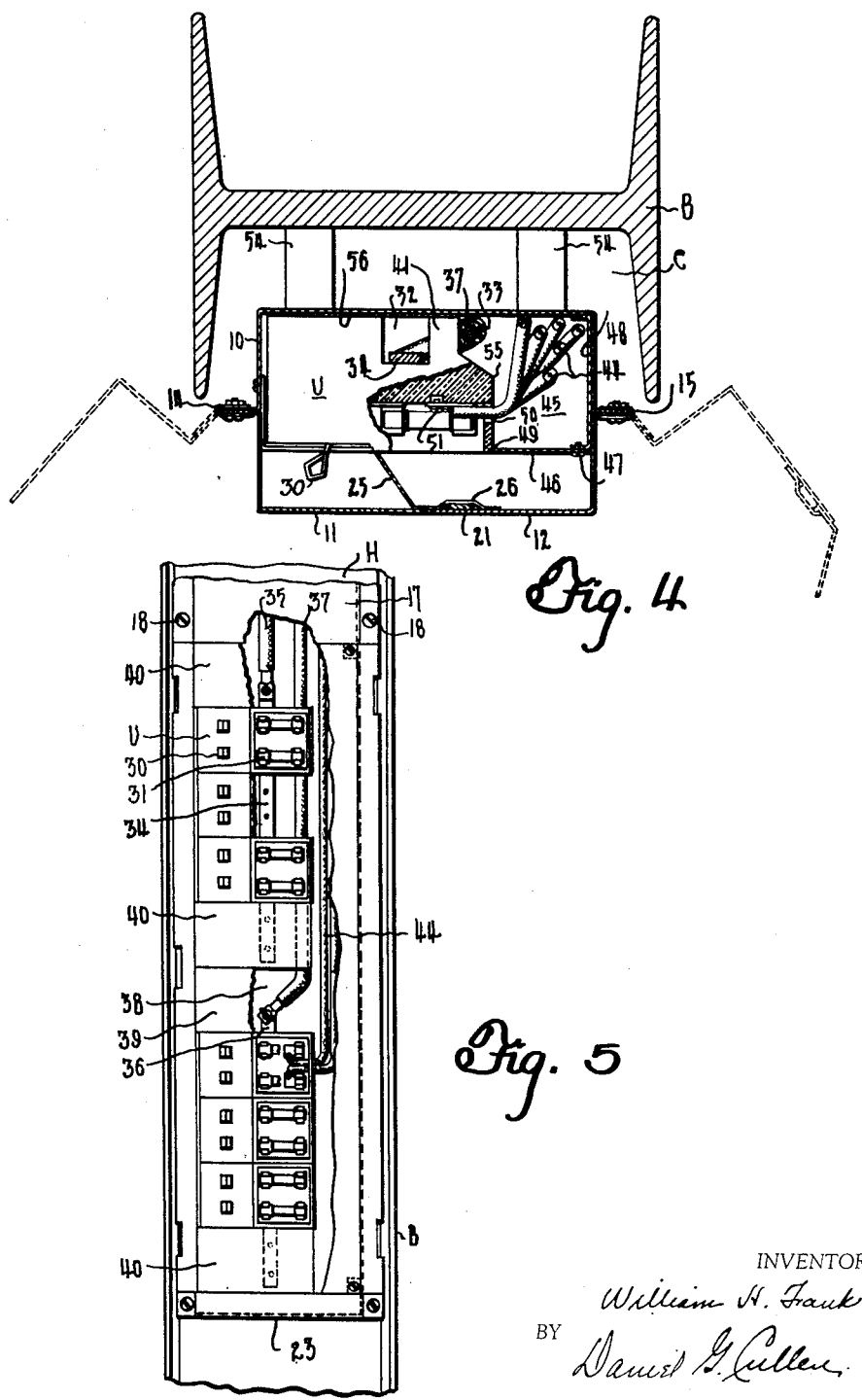
Fig. 4 is a cross section as if on line 4—4 of Fig. 2.
Fig. 5 is a fragmentary view showing details of one type of installation.

In a 3/2 wire installation where the units of the upper part of the panel are connected to one outer feed line of the three-wire system and to the neutral bar F connected to the central feed line, and where the units of the lower part of the panel are connected to the other outer feed line of such a system and to the neutral bar, the installation may well be as shown in Figs. 5 and 6.

Referring to Fig. 5 it will be seen that the bus bar for the upper units of the panel, namely bus bar 34, is disposed in a channel formed by notches 32 and is connected at its upper end to the terminal of an outer main feed cable 35 running to the panel from the overhead run through pull box E and the panel feed pull box H. The bus bar 36 for the units forming the lower half of the panel is also disposed in a channel formed by notches 32 and is supplied from another outer main feed cable 37 brought down from the cable duct run D through the pull boxes E and H; and instead of the connection between the bus bar 36 and its main feed cable 37 being at the lower end of the panelboard as is conventional, the connection may be made in a clear space 38 left between the units supplied by bus bars 34 and those supplied by bus bar 36, as shown in Fig. 5. This clear space may be closed by a filler plate 39 similar to those used at 40 for filling gaps in the panelboard left for future additional circuits. The main feed cable 37 will lie in the channel formed by the aligned notches 33 at the ends of the upper units, because separated from the bus bar 34 where it runs along with such bus bar by the legs 41 of the units which separate notches 32 from notches 33.

If desired, the expedient shown in Fig. 6 may be utilized for wiring the units to the main feed cables. In this figure the bus bar which supplies the lower units, namely bus bar 36a, is continued upwardly so as to be in line with the bus bar 34 that supplies the upper units of the panel, being received within the channel formed by cooperating notches 32 of the units, there being an offset at 36b whereby bus bar 36a will be clear of bus bar 34, insulation at 42 being disposed between the adjacent portions of these bus bars to insulate them from each other.

The branch wires, in the installations shown, are connected as follows: Half of the branch wires, one for each branch circuit, referenced 43, are connected to the neutral bar F in the pull box E and from there run through the overhead run D to the branch outlets of the latter, these wires not entering the panelboard. The other branch wires, one for each branch circuit, and referenced 44, come down from the overhead run through the pull boxes E and H and lie in the gutter 45 between the ends of the units and the adjacent wall of the base 10, which gutter may be closed by a gutter cover 46 of any desired construction. As shown, the gutter cover is secured by screws 47 to brackets 48 mounted on the base 10 and has an edge at 49 resting upon the suitably notched ends of the units.

The branch cables 44 have their terminals entered into the units for association with the proper parts thereof through end entrance holes 50 thereof, Fig. 4, and the terminal connection screws 51 which secure the terminals of cables 44 to the proper parts of the units are accessible from the fronts of the units, as will be seen in Fig. 4.

It will be observed at this time that the entrance holes 50 are substantially in line with the line of juncture between the maintenance cover 12 and the base 10. This detail of construction, cooperates with the feature that this line of juncture is adjacent the edge of the flange of the column so that when the cover 12 is opened, as in Fig. 4, easy access to the gutter 45 and to the end entrance holes 50 is provided and easy manipulation of the branch circuit cables and their terminals is assured.

When a panelboard is to be installed, the panelboard, prefabricated to include base 10, covers 11—12, and the panel C formed of the units and the bus bars, is first mounted in place on column B, as by means of brackets 54. The main feed cables 35—37 are then run in, and their terminals are suitably connected to the neutral bar and the bus bars 34—36. Then the terminals of the branch circuit cables 43—44 are associated with the neutral bar and with the units in the manner that will be apparent. The gutter cover 46 and the pull box cover 17 are then positioned to complete the installation.

After a panelboard is installed, the public may gain access thereinto for manipulation of switch handles 30 merely by opening the public cover 11, and access to the interiors of the units, or to the fuses, or to the exposed conducting parts of the units, namely the fuse clips or fuse ends, or to the remainder of the panelboard is debarred, so long as the maintenance cover 12 is closed and locked. If, however, the maintenance department wishes to gain access to the interior of the panelboard for changing of fuses of the units, or for rewiring, or for any other reason, it may do so by opening the maintenance cover. The provision of these separate covers in the manner described is of importance in that it gives the public access to all that the public requires, namely the switch handles, without providing the public with access to other parts of the panelboard.

It will be observed that the end closure plate 23 is formed in the nature of a flanged shelf and provides a satisfactory repository for spare fuses; and if such fuses are located in that part of the end closure plate 23 in registry with the space between the units and the maintenance cover 12, these fuses will be inaccessible for theft by the public, since the masking plate 25 formed as part of the maintenance cover 12 not only masks the fuse carrying parts of the units, but in addition provides a barrier between the public side of the panel and the maintenance side of the panel.

It will also be observed that in the event changes are desired in the association of branch circuit cables with the units, that access to the interior of the panelboard for such purposes may be provided, but only when authorized by the maintenance department. Under such circumstances the covers 11—12 may be swung open or held open by any suitable means, such as, for example, a cord passed around or hooking behind the flanges of the column, and when the covers are so held open the gutter cover 46 may be removed to furnish access to the interior of the panel. Under such circumstances it may be desired to gain access into the panel pull box and this may be accomplished by loosening screws 18 and removing cover plate 17.

It will be observed that the panel here shown is narrow enough to be received within the channel C of the column B, and that it does not project laterally from the column except in a direction towards the face of the panel. Accordingly, the danger of injury to the panelboard from trucks or the like moving near the column, and the danger of injury to trucks, persons, etc. moving near the column, is minimized.

It will also be observed that in the event the overhead run is made of the same type of duct that is used for panel casing, that an entire distribution system may be fabricated from one type of duct; this feature promotes economy of manufacture and installation and in addition enhances the appearance of the installation by providing uniformity of external characteristics for all parts of the system.

If desired, the main feed cable 37 may be isolated from the branch circuit wires gutter 45 by a barrier which will be perpendicular to the back of the casing base 10 and which will extend from the casing base 10 to the corners 55 of the units. This barrier may be formed as a flanged part of a shock plate 56 of paper or the like, between the units and the back of base 10, or may be formed as a flanged part of a steel mounting plate disposed between the units and the back of base 10, replacing or adding to the shock plate shown, or may be formed as part of or as secured to and carried by the units U.

It will also be observed that the gutter cover 46 and its auxiliary parts 47—48 may well be omitted and reliance placed upon the sealable maintenance cover to cover and conceal the exposed parts and wires in the gutter, under seal.

It will also be observed that while "door in door" covers for panels are old, that it is not old to provide doors which are arranged as are the covers 11—12, and that the provision of the cover construction shown is as advantageous as it is novel.

In Figs. 7-8 there is shown an installation wherein the units U are of the circuit breaker type, and the maintenance cover 12 shields only the terminals of and the binding posts 51 for the branch circuit conductors 44, and does not shield the circuit protective parts of the breakers, namely the thermal warping elements and the quick make and break mechanisms within the breakers, these being shielded by the walls of the breaker casings themselves. The shielding of the terminals and binding posts is all that is necessary, in this construction, to prevent tampering and mischief.

In Figs. 9-10 there is shown an installation wherein the units U are of the plug and fuse type, and the maintenance cover 12 is so formed that its bevel 29 prevents pulling out of the plug fuses, though permitting them to be viewed for determining their condition. In this construction, holes may be placed in the mask 46 for holding spare fuses.

This application is a continuation in part of my copending allowed application Serial No. 11,408, filed March 16, 1935, which I hereby abandon in favor of this case.

I claim:

1. A panelboard comprising a panel of small cross sectional area, and a panel casing of uniform cross section considerably greater in length than the panel but only slightly greater in cross sectional area than the panel, to provide a panel enclosing portion and a panel pull box portion, the casing being made up of sheet metal conduit split longitudinally to provide a back section in which is seated the panel, and in which are laid the conductors whose terminals are connected to the panel, and a front section which forms a cover for the pull box portion and for the panel receiving portion of the back section, the front section being split transversely so that the pull box cover is separate from the panel cover, the panel cover being split longitudinally so that each part thereof, when open, exposes a narrow stripe of the panel, one narrow stripe of the panel comprising circuit protective parts arranged in a single vertical row, the other narrow stripe of the panel comprising switching parts arranged in a single vertical row.

2. A panelboard comprising a panel all of whose circuit protective parts are arranged in a single narrow vertically extending stripe and all of whose switching parts are arranged in another single narrow vertically extending stripe, and a panel casing front comprising narrow vertically extending doors which meet in a line in front of the panel and between the stripes and which are hinged to opposite vertical side edges of the casing, each door covering one of the stripes.

3. A panelboard comprising a panel all of whose circuit protective parts are arranged in a single narrow vertically extending stripe and all of whose switching parts are arranged in another single narrow vertically extending stripe, and a panel casing front comprising narrow vertically extending doors which meet in a line in front of the panel and between the stripes and which are hinged to opposite vertical side edges of the casing, each door covering one of the stripes, the covers being so interlocked that the door over the stripe of the switching parts is operable even when the other door is closed.

4. A panelboard comprising a panel having circuit protective parts provided with exposed conducting portions and also having switching parts, the exposed conducting portions of all the circuit protective parts being arranged in a single narrow vertically extending stripe and all of the switching parts being arranged in another single narrow vertically extending stripe, and a panel casing front comprising narrow vertically extending doors which meet in a line in front of the panel and between the stripes and which are hinged to opposite vertical side edges of the casing, each door covering one of the stripes.

5. A construction of the character described in claim 4 wherein the doors are so interlocked that the door over the stripe of switching parts is openable even when the other door is closed and wherein the door over the stripe of exposed conducting portions of the circuit protective parts is openable only when the other door is open.

6. A construction of the character described in claim 4, the doors being forwardly spaced from the panel, with the door covering the stripe of exposed conducting parts of the circuit protective parts having a flange projecting from the door to the panel to isolate the space between the panel and that door from the space between the panel and the other door.

7. A construction of the character described in claim 4, wherein the doors are forwardly spaced from the panel and wherein the circuit protective parts are laterally spaced from the side edge of the casing to which is hinged the door over the stripe of exposed conducting parts of the circuit protective parts, there being a plate behind the latter door covering such space.

8. A construction of the character described in claim 4, wherein the doors are forwardly spaced from the panel and wherein the circuit protective parts are laterally spaced from the side edge of the casing to which is hinged the door over the stripe of exposed conducting parts of the circuit protective parts, there being a plate behind the latter door covering such space, the latter door having a flange projecting from the door to the panel to isolate the space between the panel and that door from the space between the panel and the other door.

WILLIAM H. FRANK.